United States Patent [19]

Farrington et al.

[11] 4,004,946
[45] Jan. 25, 1977

[54] SEALED LITHIUM-CHLORINE CELL

[75] Inventors: Gregory C. Farrington, Elnora; Walter L. Roth, Schenectady, both of N.Y.

[73] Assignee: General Electric Company, Schenectady, N.Y.

[22] Filed: June 23, 1975

[21] Appl. No.: 589,136

Related U.S. Application Data

[63] Continuation-in-part of Ser. No. 517,513, Oct. 24, 1974, abandoned.

[52] U.S. Cl. .................................. 429/72; 429/193; 429/218
[51] Int. Cl.² ..................... H01M 6/18; H01M 8/10
[58] Field of Search ............... 136/153, 86 A, 61 N, 136/6 FS, 6 SA, 83 R

[56] References Cited
UNITED STATES PATENTS

| | | |
|---|---|---|
| 3,475,225 | 10/1969 | Tennenhouse ................... 136/153 |
| 3,573,105 | 3/1971 | Weininger et al. ............... 136/153 |
| 3,795,723 | 3/1974 | Clendenen ........................ 136/153 |
| 3,868,273 | 2/1975 | Will et al. ........................ 136/86 A |

Primary Examiner—Anthony Skapars
Assistant Examiner—H. A. Feeley
Attorney, Agent, or Firm—Paul R. Webb, II; Joseph T. Cohen; Jerome C. Squillaro

[57] ABSTRACT

A sealed lithium-chlorine cell is described which comprises a casing, an anode positioned within the casing, the anode selected from the class consisting of lithium, lithium as an amalgam, and lithium in a non-aqueous electrolyte, a cathode positioned within the casing, the cathode comprising chlorine with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of Li-NaO·9Al$_2$O$_3$ of which 1.3 to 85% of the total alkali ion content is lithium.

5 Claims, 5 Drawing Figures

SEALED LITHIUM-CHLORINE CELL

This application is a continuation-in-part of application Ser. No. 517,513, filed Oct. 24, 1974, and now abandoned, under the same title and in the same names.

This invention relates to sealed cells and, more particularly, to such cells employing a lithinum anode, a chlorine cathode, and a solid lithium-sodium aluminate electrolyte.

Cross-reference is made to copending patent applications Ser. Nos. 517,511 and 517,512 filed Oct. 24, 1974 and now abandoned, in the names of Gregory C. Farrington and Walter L. Roth and entitled "Sealed Lithium-Bromine Cell" and "Sealed Lithium-Iodine Cell", respectively, and to copending applications, Ser. Nos. 589,135 and 589,137 filed June 23, 1975 in the same names and under the same titles, respectively. Cross-reference is made to copending patent applications Ser. Nos. 557,583 and 557,584 filed Mar. 12, 1975 now U.S. Pat. Nos. 3,953,228 and 3,953,229; respectively, both issued Apr. 27, 1976, in the names of Water L. Roth and Gregory C. Farrington and entitled "Sealed Lithium-Reducible Phosphorous Oxyhalide Cell" and "Sealed Lithium-Reducibile Sulfur Oxyhalide Cell", respectively. Cross-reference is made to copending patent applications Ser. Nos. 559,901 and 559,990 filed Mar. 19, 1975, the latter application now U.S. Pat. No. 3,953,233, issued Apr. 27, 1976, in the names of Walter L. Roth and Gregory C. Farrington and entitled "Sealed Lithium-Reducible Gas Cell" and "Sealed Lithium-Sulfur Monochloride Cell", respectively. Cross-reference is made to copending patent applications Ser. Nos. 571,500 and 571,556 filed Apr. 25, 1975 now U.S. Pat. Nos. 3,953,230 and 3,953,231, respectively, both issued Apr. 27, 1976, in the names of Gregory C. Farrington and Walter L. Roth and entitled "Sealed Lithium-Phosphorous Cell" and "Sealed Lithium-Sulfur Cell", respectively. Cross-reference is made to copending patent application, Ser. No. 572,278 filed Apr. 28, 1975 now U.S. Pat. No. 3,953,232 issued Apr. 27, 1976, in the names of Gregory C. Farrington and Walter L. Roth and entitled "Sealed Lithium-Reducible Metal Salt Cell". All of the above copending applications are assigned to the same assignee as the present application.

In McRae et al. U.S. Pat. No. 3,607,417 entitled "Battery Cell" there is described a battery which employs a lithium or sodium type anode, a porous ceramic barrier including a liquid impervious thin membrane surrounding the anode, an aqueous electrolyte surrounding the barrier, an air cathode surrounding the aqueous electrolyte, an oxidant compartment surrounding the air cathode, and an oxidant of oxygen, sulfur, chlorine or bromine which is used with lithium or sodium as specified in column 3, lines 14–19 of the patent. The McRae et al. patent does not teach a lithium-chloride cell with a solid lithium-sodium aluminate electrolyte with lithium conductivity. This patent does not teach a sealed cell, or such a cell with a non-aqueous cathode. Further, this patent does not teach the cathode in contact with solid electrolyte.

Present molten salt lithium chloride batteries require direct contact between a molten lithium anode and a molten salt electrolyte. This restricts the electrolyte to those salts that are stable towards reduction by lithium. This limitation is particularly severe since lithium can react with almost any metallic salt. The need to use molten lithium salts as electrolytes in lithium chloride batteries necessitates operating such batteries at high temperatures of typically greater than 400° C at which lithium salts are liquid. High operating temperatures, in turn, accelerate battery corrosion and decrease battery life.

The elevated temperature lithium chloride battery described in the present invention uses a solid lithium-sodium conductive electrolyte to contain its molten lithium anode. Thus, there is no need for the molten salt electrolyte present in the cathode chamber to be stable towards reaction with lithium since it is restricted from contacting the lithium anode. Therefore, it is possible to use cathodic electrolytes comprised of cationic salt mixtures that melt at comparatively low temperatures, significantly reducing corrosion and increasing battery life. Examples of such salt mixtures include 0%–46% LiCl + 64% –100% $AlCl_3$ with an operating temperature = 200° C and 0%–40% LiCl = 60%–100% $ZnCl_2$ with an operating temperature = 370° C.

In Weininger et al. U.S. Pat. No. 3,573,105 there is described a rechargeable non-aqueous alkali metal-halogen electrochemical cell which includes an alkali metal anode, a halogen cathode, a non-aqueous electrolyte, and an ion-permeable barrier to inhibit migration of halogen to the negative electrode between the electrodes. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al. barrier. The electrolyte of the present invention permits cell operation at temperatures above the polymer barrier stability of Weininger et al.

In Liang U.S. Pat. No. 3,713,897 there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. Our electrolyte is not prone to destruction in non-aqueous solvents as opposed to the Liang Patent material.

In "Progress in Solid State Chemistry", No. 7, edited by A. Reiss and J. O. McCaldin, published by Pergamon Press in 1972, there is a Section 5 entitled "β-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between β-alumina and various binary nitrate melts containing $NaNO_3$ and another metal nitrate at 300°–350° C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lithium ions in a melt of $LiNO_3$—LiCL. Throughout the above Kummer publication there is no recognition that the lithium-sodium β-alumina produced by equilibration of sodium beta-alumina with molten $LiNO_3$ is a unique and stable compound which can readily transport lithium ions without substantially altering its content of sodium ions.

Our present invention is directed to a sealed lithium-chlorine cell with positive separation of the anode and cathode by a solid lithium-sodium aluminate electrolyte which is lithium ion conductive.

The primary object of our invention is to provide a lithium-chlorine cell which has high cell voltage, high energy density, a near-zero self-discharge rate, and secondary operation capability.

In accordance with one aspect of our invention, a sealed lithium-chlorine cell employs a lithium anode, a chlorine cathode, and a solid lithium-sodium aluminate electrolyte which is a lithium ion conductor therebetween.

These and various other objects, features and advantages of the invention will be better understood from the following description taken in connection with the accompanying drawing in which.

Figure 1:
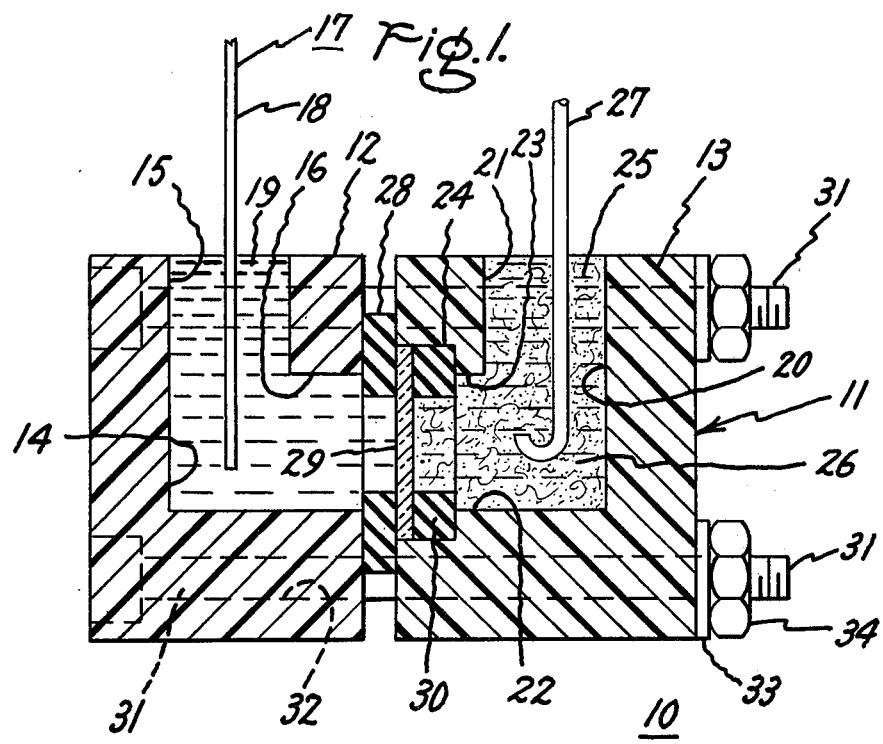
FIG. 1 is a sectional view of a lithium-chlorine cell made in accordance with our invention.

In FIG. 1 of the drawing, there is shown generally at 10 a lithium-chlorine cell embodying our invention. While we tested this open cell for operability, the cell for general use is sealed. The cell has a two part Teflon polymer casing 11 including an anode portion 12 and a cathode portion 13. Anode portion defines a chamber 14 therein with an upper opening 15. An opening 16 is provided in one side wall. An anode 17 comprises a lithium metal foil 18 in a non-aqueous electrolyte or solvent 19 within chamber 14. Cathode portion 13 defines a chamber 20 therein with an upper opening 21. An opening 22 is provided in one side wall, which opening 22 is shown with a first portion 23 and a recessed portion 24. A cathode 25 comprises chlorine dissolved in an ionic conductivity enhancing material of a non-aqueous electrolyte with carbon felt 26 positioned within chamber 20 as a current collector. In this configuration, chlorine is bubbled into cathode chamber 20 through a tube 27 which is connected to a chlorine source (not shown). Appropriate electrical leads (not shown) are connected to anode 17 and cathode 25. Two part casing 11 has its anode portion 12 and cathode portion 13 positioned adjacent to one another and in communication with one another in a leakproof manner by aligning openings 16 and 22 and positioning between the two portions a washer 28, for example, of silicone rubber. A solid lithium-sodium aluminate electrolyte 29 in the form of a disc is positioned against the outer surface of washer 28 and the outer surface of a similar silicone washer 30 fitted within recess 24 of opening 22. The two part casing 11 is held together tightly and in a leak-proof fashion by employing a pair of threaded fasteners 31 which extend through an appropriate opening 32 through both parts of casing 11. A washer 33 and a nut 34 are provided for the threaded end of each fastener to position the structure together. The above assembly results in a lithium-chlorine cell which can be employed as a primary cell or as a secondary cell.

Figure 2:
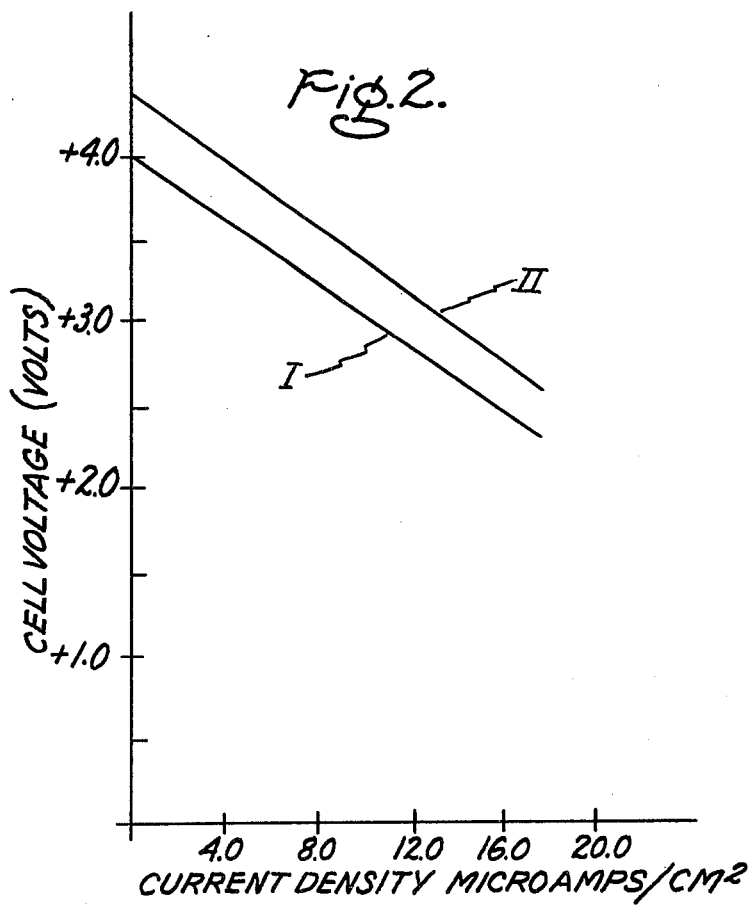
FIG. 2 is a set of polarization curves showing cell performances of the cell shown in FIG. 1 at 28° C.

In FIG. 2, performances of the cell shown in FIG. 1 are provided by polarization curves at a temperature of 28° C. In this Figure, cell voltage in volts is plotted against current density in microamperes per square centimeter.

Figure 3:
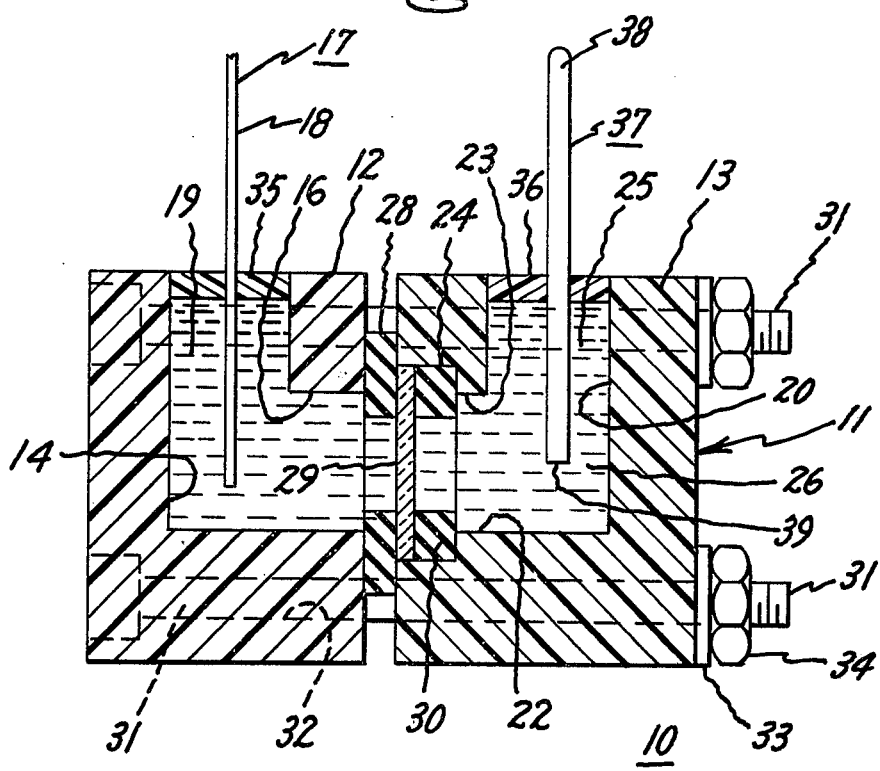
FIG. 3 is a sectional view of a sealed lithium-chlorine cell made in accordance with our invention.

In FIG. 3, there is shown a sealed lithium-chlorine cell made in accordance with our invention. This cell, which will be described further, includes a chlorine supply means connected to and in communication with the cathode.

We found that we could form a sealed lithium-chlorine cell with a lithium ion-conductive electrolyte by employing a casing having a cathode portion and an anode portion. These two portions are separated by a solid lithium-sodium aluminate electrolyte which will be further described below. Such a casing may be provided in various configurations. For purposes of showing the operability of our cell, we used an anode portion and a cathode portion each of which had top and side openings. Since it was not necessary, the top openings were not sealed during assembly and testing. The casing material chosen was Teflon polymer. A silicone rubber washer was positioned in the recessed opening of the cathode portion and a solid lithium-sodium electrolyte was positioned adjacent to the washer within the recessed opening. A silicone rubber washer was positioned between the casing portions. The side openings of the casing portions and the washers were aligned to provide for contact of the cathode with one surface of the solid electrolyte and for contact of the anode with the other surface of the electrolyte. We employed threaded fasteners to hold the casing portions together in a unitary cell structure. It will, of course, be appreciated that various other cell configurations can be employed. In addtion to the Teflon polymer casing material various metals and non-metals can be used. Other materials can be substituted for the silicone washers. If desired, in the configuration, the solid electrolyte disc could be sealed by glass seals to the casing to separate the cathode from the anode as shown, for example, in above-mentioned U.S. Pat. No. 3,817,790.

For the anode we can employ lithium, lithium as an amalgam or lithium in a non-aqueous electrolyte. Suitable non-aqueous electrolytes include propylene carbonate, butyrolactone, tetrahydrofuran and acetonitrile containing conductivity salts such as LiClO 4 and tetrabutylammonium tetrafluoroborate. For the cathode we can employ chlorine with an ionic conductivity enhancing material. We employ a solid lithium-sodium aluminate electrolyte between the cathode and anode to provide a solid barrier preventing contact between the electrodes and to provide lithium ion conductivity. The solid lithium-sodium ion-conductive electrolyte has an approximate composition of $LiNaO \cdot 9Al_2O_3$ of which 40 to 60 percent of the total alkali content is lithium. As it was discussed above in "Progress In Solid State Chemistry", J. T. Kummer, Section 5 describes a lithium-sodium, β-alumina material, particularly on pages 149–151. Further it is described in the article how to manufacture such material. As it will be particularly noted throughout the above Kummer publication, there is no recognition that the lithium-sodium sodium β-alumina produced by equilibration of sodium β-alumina with molten $LiNO_3$ is a unique and stable compound which can readily transport lithium ions without substantially altering its content of sodium ions. We use such material containing 50 percent lithium ions as a solid lithium ion conductor electrolyte in our cell. The results of performance of this cell are shown in FIG. 2. Such material containing 50 percent lithium ions appears to be the optimum amount of lithium ions in the material.

A range of 40 to 60 percent lithium ions in the electrolyte material with the remainder sodium ions provides the desirable conductivity for the operation of our cells. We found unexpectedly that we could obtain the desirable conductivity necessary for the operation of our cells by employing a broader range of 1.3 to 85 percent lithium ions in the electrolyte material with the remainder sodium ions. Tubes made of solid lithium-sodium aluminate electrolyte containing, respectively, 1.34 and 84.7 percent sodium ion substitution by lithium ions were used in later cells of the type shown in FIG. 4, described above, and the results of which are shown in FIG. 5.

We found further that for the cathode we could employ chlorine with various ionic conductivity enhancing materials, such as chemically stable organic non-aqueous electrolytes, inorganic non-aqueous electrolytes, metal salts, and quaternary ammonium salts. Suitable non-aqueous electrolytes include propylene carbonate, sulfuryl chloride, thionyl chloride, phosphorous oxychloride, acetonitrile, butyrolactone, and tetrahydrofuran which can be used with various salts such as LiCl, LiCN and LiCNS; tetraalkyl-ammonium-halides, cyanides, thiocyanates, perchlorates and tetrafluoroborate.

In addition to the above ionic conductivity enhancing materials for chlorine, fused salt electrolytes can be employed. Suitable electrolytes include fused alkali and alkaline earth halides, nitrates, and tetrachloroaluminates. As it is shown in FIG. 1 of the drawing, chlorine gas is bubbled through the cathode chamber by means of a tube from a chlorine source such as a chlorine gas cylinder. When a sealed cell is employed the same type chlorine source and tube can be used wherein the tube is sealed to the cell or cell cover through which it projects.

In FIG. 3, there is shown a sectional view of a sealed lithium-chlorine cell with a chlorine supply means, which cell is capable of secondary operation. The same numerals have been applied to this cell as to the cell in FIG. 1. Anode portion 12 has a cover 35 sealed thereto thereby closing chamber 14. Lithium foil 18 extends outwardly through cover 35. Cathode portion 13 has a cover 36 sealed thereto thereby closing chamber 20. A cylinder 37 with a closed end 38 and with an open end 39 extends outwardly through cover 36. Closed end 38 is positioned outside cell 10 while open end 39 is positioned within cathode chamber 20. Cylinder 37 is filled with chlorine gas. During discharge of the cell, chlorine gas is bubbled from the cylinder through the cathodic electrolyte. During subsequent charging of the cell, chlorine gas is bubbled from the cathodic electrolyte into the cylinder.

Lithium is the lightest practical solid battery anode material and is also the most reducing. The lithium ion is a small and strongly polarizing ion. The salts of the lithium ions are generally more soluble in non-aqueous solvents than their sodium ion counterparts. Such high solubility helps eliminate salt precipitation on the faces of a solid electrolyte and is thus vital for efficient secondary cell operation.

Figure 4:
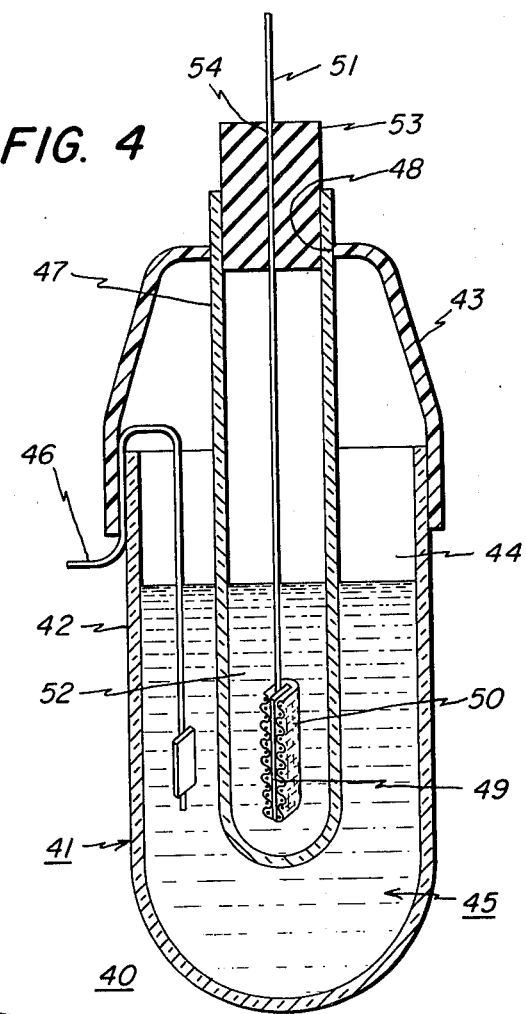
FIG. 4 is a sectional view of a modified lithium-chlorine cell made in accordance with our invention.

In FIG. 4 of the drawing there is shown generally at 40 a modified sealed lithium-chlorine cell embodying our invention. An outer casing 41 comprising a lower casing portion 42 of glass and an upper casing portion 43 of polyethylene affixed tightly to the upper open end of the lower casing portion 42 thereby provides a chamber 44 for a cathode 45 of a saturated solution of chlorine in a non-aqueous solvent with an ionic conductivity enhancing material and a platinum electrode 46. Electrode 46 extends to the exterior of cell 41 through the junction of the lower and upper casing portions 42 and 43. An inner casing 47 in the form of a tube of solid lithium-sodium aluminate electrolyte is positioned within lower casing portion 42 and immersed partially in cathode 45. An opening 48 is provided in the top of upper casing portion 43 into which tube 47 fits tightly. An anode 49 of lithium metal in the form of a lithium ribbon pressed onto a nickel mesh 50 which is folded together and attached to the end of a nickel electrical lead 51. An anolyte 52 partially fills tube 47 and is in contact with lithium anode 49. An electrically insulating closure 53 with a hole 54 therethrough is provided at the upper end of tube 47 to seal the initially open end of the tube. Lead 51 extends through hole 54 in closure 53 to the exterior of cell 40.

Figure 5:
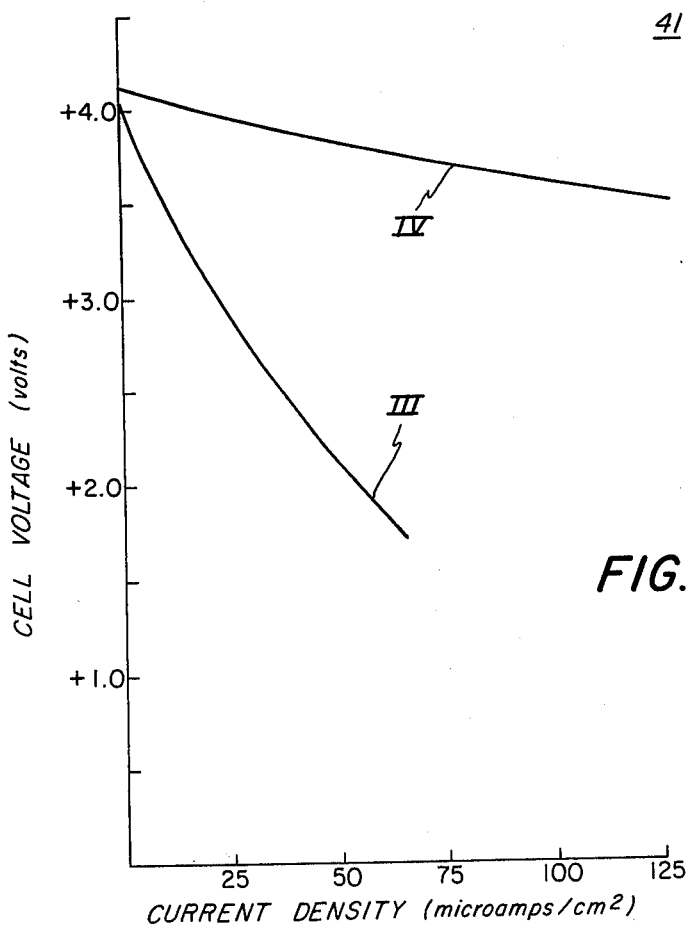
FIG. 5 is a set of polarization curves showing cell performance of the cell shown in FIG. 4.

In FIG. 5, performances of the cell shown in FIG. 4 are provided by polarization curves which were each produced at a temperature of 26° C. In this Figure, cell voltage in volts is plotted against current density in microamperes per square centimeter.

We found further that we could form various modified sealed lithium-chlorine cells embodying our invention. One such modified cell employs an outer casing comprising a lower casing portion of glass and an upper casing portion of a plastic such as polyethylene affixed tightly to the upper open end of the lower casing portion thereby providing a chamber for a cathode of a saturated solution of chlorine in a non-aqueous solvent with an ionic conductivity enhancing material. A platinum electrode extends from the cathode to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium metal in the form such as lithium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

Examples of lithium-chlorine cells, which can be readily sealed, made in accordance with our invention are set forth below:

EXAMPLES I–II

Two cells were assembled as generally described above and shown in FIG. 1 of the drawing. For each cell, a lithium-sodium aluminate electrolyte disc was made by first preparing a cylinder of β-alumina by firing $Na_2O+9Al_2O_3$ plus 1 percent MgO at 1750° C. The density of the β-alumina cylinder was 3.224 g/cm$^3$ corresponding to less than 1 percent void volume. A disc of 1 mm in thickness was sliced from the cylinder and converted to a lithium-sodium aluminate electrolyte by immersion in molten LiNO₃ at 400° C for 24 hours. The exchange of the sodium ions for the lithium ions was accompanied by a 1.91 percent decrease in weight and the final density was 3.148 g/cm³. X-ray diffraction showed that the electrolyte disc has a hexagonal crystal structure with lattice parameters $a = 5.603 \pm 0.001$ A and $c = 22.648 \pm 0.003$ A.

A two part Teflon polymer casing which included an anode portion and a cathode portion was employed to assemble each cell. Each portion had a chamber with an upper opening and a side opening. The side opening in one portion, the cathode portion, was further recessed. A silicone washer was positioned in the side opening of the cathode portion. The above prepared lithium-sodium aluminate electrolyte disc was positioned against the washer and within the recessed opening in the cathode portion. A silicone washer was positioned between the casing portions and the openings in the washer and in the casing portions were aligned. A pair of threaded fasteners were then employed to hold the casing portions together and tightened at one end by nuts. The chamber of each anode portion was provided with an anode consisting of an electrolyte of propylene carbonate with dissolved lithium perchlorate and tetrabutylammonium fluoroborate. A lithium foil anode was then inserted therein and held in position in the chamber and in contact with the electrolyte. Carbon felt was fitted into the chamber within the cathode portion to provide a current collector. Cell I, which is Example I, had its anode chamber filled with propylene carbonate. Cell II, which is Example II, had its cathode chamber filled with sulfuryl chloride. A tube was inserted separately into each cell cathode thereby bubbling chlorine gas into the electrolyte. The tube was connected to a chlorine gas cylinder. This structure resulted in a lithium chlorine cell made in accordance with our invention which cell could be readily sealed. The open circuit voltage of Cell I was 4.0 volts while the open circuit voltage of Cell II was 4.4 volts.

EXAMPLE III-IV

The performance of the Cells I and II of Examples I and II are shown in the polarization curves in FIG. 2 of the drawing. The cell voltage in volts is plotted against current in microamperes per square centimeter at a temperature of 28° C.

No attempts were made to minimize interfacial polarization at the lithium-sodium ion-conductive electrolyte interfaces.

EXAMPLES V-VI

Two cells Nos. 3 and 4, which are examples V and VI, were assembled as generally described above and as shown in FIG. 4 of the drawing. Each of the cells was constructed in the same manner with the exception that cell No. 3 had a lithium-sodium aluminate tube with a 84.7 percent lithium ion content while cell No. 4 had a lithium-sodium aluminate tube with a 1.34 percent lithium ion content. The remaining alkali ion content of each tube was sodium ions.

The tube for cell No. 3 was formed from a tube of sodium β-alumina approximately 6.2 cm. long, 1.1 cm. OD, and 0.15 cm. wall thickness. The tube was baked out overnight at 1175° C prior to lithium ion exchange. The lithium ion exchange was made by immersion in lithium nitrate at 600° C for 13 hours. A resulting 3.12 percent weight decrease corresponded to 84.7 percent sodium subsitution by lithium ions.

The tube for cell No. 4 was formed from an identical sodium β-alumina tube which was baked out in the same manner. The lithium ion exchange was made by immersion in 20 mole percent lithium nitrate and 80 mole percent sodium nitrate at 400° C for 72 hours. A resulting 0.049 percent weight decrease corresponded to 1.34 percent sodium substitution by lithium ions.

For each cell, an outer casing was formed of a lower casing portion of glass and an upper casing portion of polyethylene affixed tightly to the upper open end of the lower casing portion thereby providing a chamber for each cathode which consisted of a saturated solution of chlorine in a non-aqueous solvent of propylene carbonate containing lithium perchlorate with 0.1M tetrabutylammonium fluoroborate and saturated with LiClO₄. A platinum electrode was immersed in the cathode and extended to the exterior of the cell through the junction of the lower and upper casing portions. An inner casing in the form of a tube of solid lithium-sodium aluminate electrolyte was positioned within each outer casing and immersed partially in the cathode. The tube for cell No. 3 contained 84.7 percent lithium ion content while the tube for cell No. 4 contained 1.34 percent lithium ion content. An opening was provided in the top of each upper casing portion into which the respective tube fitted tightly. An anode of lithium metal in the form of a lithium metal ribbon pressed onto a nickel mesh was fold together and attached to the end of a nickel electrical lead. An anolyte of 0.1M tetrabutylammonium tetrafluoroborate in propylene carbonate saturated with LiClO₄ partially filled the tube and was in contact with the lithium anode. An electrically insulating closure with a hole therethrough was provided at the upper end of each tube to seal the initially open end of the tube. The lead extended through the hole in the closure to the exterior of the cell.

The polarization curves for cells Nos. 3 and 4, which are shown in FIG. 5 of the drawing, were produced at a temperature of 26° C. The cell voltage in volts is plotted against current in microamperes per square centimeter for each cell. The curve for cell No. 3 is identified as curve III and the curve for cell No. 4 is identified as curve IV in FIG. 5 of the drawing. No attempts were made to minimize interfacial polarization at the lithium-sodium aluminate ion-conductive electrolyte interfaces.

While other modifications of the invention and variations thereof which may be employed within the scope of the invention have not been described, the invention is intended to include such as may be embraced within the following claims.

What we claim as new and desire to secure by Letters Patent of the United States is:

1. A sealed lithium-chlorine cell comprises a casing, an anode positioned within the casing, the anode selected from the class consisting of lithium, lithium as an amalgam and lithium in a non-aqueous electrolyte, a cathode positioned within the casing, the cathode comprising chlorine with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO \cdot 9Al_2O_3$ of which 1.3 to 85.0 percent of the total alkali content is lithium.

2. A sealed lithium-chlorine cell as in claim 1, in which 40 to 60 percent of the total alkali ion content is lithium.

3. A sealed lithium-chlorine cell as in claim 1, in which 50 percent of the total alkali content of the solid lithium-sodium aluminate electrolyte composition is lithium.

4. A sealed lithium-chlorine cell as in claim 1, in which a chlorine supply means is connected to and in communication with the cathode.

5. A sealed lithium-chlorine cell as in claim 4, in which the chlorine supply means is a sealed container.

* * * * *